United States Patent
Zhang et al.

(10) Patent No.: US 11,122,566 B2
(45) Date of Patent: Sep. 14, 2021

(54) WAVEFORM DESIGN BASED ON POWER SPECTRAL DENSITY (PSD) PARAMETERS

(71) Applicant: QUALCOMM Incorporated, San Diego, CA (US)

(72) Inventors: Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 16/020,400

(22) Filed: Jun. 27, 2018

(65) Prior Publication Data
US 2019/0029019 A1  Jan. 24, 2019

Related U.S. Application Data

(60) Provisional application No. 62/535,098, filed on Jul. 20, 2017.

(51) Int. Cl.
*H04W 72/04* (2009.01)
*H04W 52/16* (2009.01)
(Continued)

(52) U.S. Cl.
CPC ....... *H04W 72/0453* (2013.01); *H04L 5/0007* (2013.01); *H04L 5/0042* (2013.01);
(Continued)

(58) Field of Classification Search
USPC .......................................................... 370/329
See application file for complete search history.

(56) References Cited

U.S. PATENT DOCUMENTS

2010/0067591 A1* 3/2010 Luo .................. H04L 1/0025
375/260

FOREIGN PATENT DOCUMENTS

WO  WO-2017196387 A1  11/2017
WO  WO-2018080758 A1   5/2018
WO  WO-2018094247 A1   5/2018

OTHER PUBLICATIONS

Huawei et al., "NR Numerology on Unlicensed Bands", 3GPP Draft; R1-1711465, 3rd Generation Partnership Project (3GPP), Mobile Competence Centre; 650, Route Des Lucioles; F-06921 Sophia-Anti Polis Cedex; France, vol. RAN WG1, No. Qingdao, China; Jun. 27, 2017-Jun. 30, 2017 Jun. 26, 2017, XP051300650, Retrieved from the Internet: URL:http://www.3gpp.org/ftp/Meetings_3GPP_SYNC/RAN1/Docs/[retrieved on Jun. 26, 2017], 6 pages.
International Search Report and Written Opinion—PCT/US2018/039992—ISA/EPO—dated Sep. 27, 2018.
Samsung: "Details on Resource Pool design", 3GPP Draft; R1-164764, 3rd Generation Partnership Project (3GPP), Mobile Competence Centre; 650, Route Des Lucioles; F-06921 Sophia-Anti Polis Cedex; France, vol. RAN WG1, No. Nanjing, China; May 14, 2016,
(Continued)

*Primary Examiner* — Natasha W Cosme
(74) *Attorney, Agent, or Firm* — Qualcomm Incorporated

(57) ABSTRACT

Wireless communications systems and methods related to communicating in a frequency spectrum using interlaced frequency channels and non-interlaced frequency channels are provided. A first wireless communication device selects a waveform structure between an interlaced frequency structure and a non-interlaced frequency structure for communicating in a frequency spectrum. The first wireless communication device communicates, with a second wireless communication device in the frequency spectrum, a communication signal based on the selected waveform structure. The interlaced frequency structure includes at least a first set of frequency bands in the frequency spectrum, the first set of frequency bands interlacing with a second set of frequency bands in the frequency spectrum. The non-interlaced frequency structure includes one or more contiguous frequency bands in the frequency spectrum.

45 Claims, 10 Drawing Sheets

(51) Int. Cl.

| | |
|---|---|
| *H04L 5/00* | (2006.01) |
| *H04W 52/36* | (2009.01) |
| *H04L 1/00* | (2006.01) |
| *H04L 27/26* | (2006.01) |
| *H04W 52/50* | (2009.01) |
| *H04W 16/14* | (2009.01) |
| *H04W 74/08* | (2009.01) |

(52) U.S. Cl.
CPC ........ *H04L 5/0066* (2013.01); *H04L 27/2602* (2013.01); *H04W 52/16* (2013.01); *H04W 52/365* (2013.01); *H04W 52/50* (2013.01); *H04L 5/0037* (2013.01); *H04L 5/0053* (2013.01); *H04L 5/0092* (2013.01); *H04L 27/2614* (2013.01); *H04W 16/14* (2013.01); *H04W 74/0833* (2013.01)

(56) References Cited

OTHER PUBLICATIONS

XP051089924, Retrieved from the Internet: URL:http://www.3gpp.org/ftp/tsg_ran/WG1_RL1/TSGR1_85/Docs/ (retrieved on May 14, 2016], 3 pages.

Samsung: "PRACH Transmission for UL LAA", 3GPP Draft; R1-164748 LAA PRACH, 3rd Generation Partnership Project (3GPP), Mobile Competence Centre; 650, Route Des Lucioles; F-06921 Sophia-Anti Polis Cedex; France, vol. RAN WG1, No. Nanjing, China; May 23, 2016-May 27, 2016 May 14, 2016, XP051096335, Retrieved from the Internet: URL:http://www.3gpp.org/ftp/tsg_ran/WG1_RL1/TSGR1_85/Docs/ [retrieved on May 14, 2016], 3 pages.

* cited by examiner

WAVEFORM DESIGN BASED ON POWER SPECTRAL DENSITY (PSD) PARAMETERS

CROSS REFERENCE TO RELATED APPLICATIONS

The present application claims priority to and the benefit of the U.S. Provisional Patent Application No. 62/535,098, filed Jul. 20, 2017, which is hereby incorporated by reference in its entirety as if fully set forth below and for all applicable purposes.

TECHNICAL FIELD

This application relates to wireless communication systems and methods, and more particularly to communicating in a frequency spectrum using interlaced frequency channels and non-interlaced frequency channels based on power spectral density (PSD) parameters.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

Some shared spectrums and/or unlicensed spectrums may have certain PSD requirements. For example, the European Telecommunications Standard Institute (ETSI) document EN 301 893 V2.1.1 specifies various PSD limits for sub-6 GHz frequency bands and the ETSI draft document EN 302 567 V2.0.22 specifies a maximum equivalent isotropic radiated power (EIRP) and an EIRP density for 60 GHz frequency bands. Some other frequency bands, such as citizens broadband radio service (CBRS) bands at about 3.5 GHz, may not restrict transmissions to a particular PSD limit. In general, different spectrums may have different PSD requirements and/or different bandwidth occupancy requirements. Thus, during spectrum sharing, transmissions in such shared spectrums and/or unlicensed spectrums are required to meet PSD requirements and/or frequency occupancy requirements of corresponding spectrums.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication including selecting, by a first wireless communication device, a waveform structure between an interlaced frequency structure and a non-interlaced frequency structure for communicating in a frequency spectrum; and communicating, by the first wireless communication device with a second wireless communication device in the frequency spectrum, a communication signal based on the selected waveform structure.

In an additional aspect of the disclosure, an apparatus including a processor configured to select a waveform structure between an interlaced frequency structure and a non-interlaced frequency structure for communicating in a frequency spectrum; and a transceiver configured to communicate, with a second wireless communication device in the frequency spectrum, a communication signal based on the selected waveform structure.

In an additional aspect of the disclosure, a computer-readable medium having program code recorded thereon, the program code including code for causing a first wireless communication device to select a waveform structure between an interlaced frequency structure and a non-interlaced frequency structure for communicating in a frequency spectrum; and code for causing the first wireless communication device to communicate, with a second wireless communication device in the frequency spectrum, a communication signal based on the selected waveform structure.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
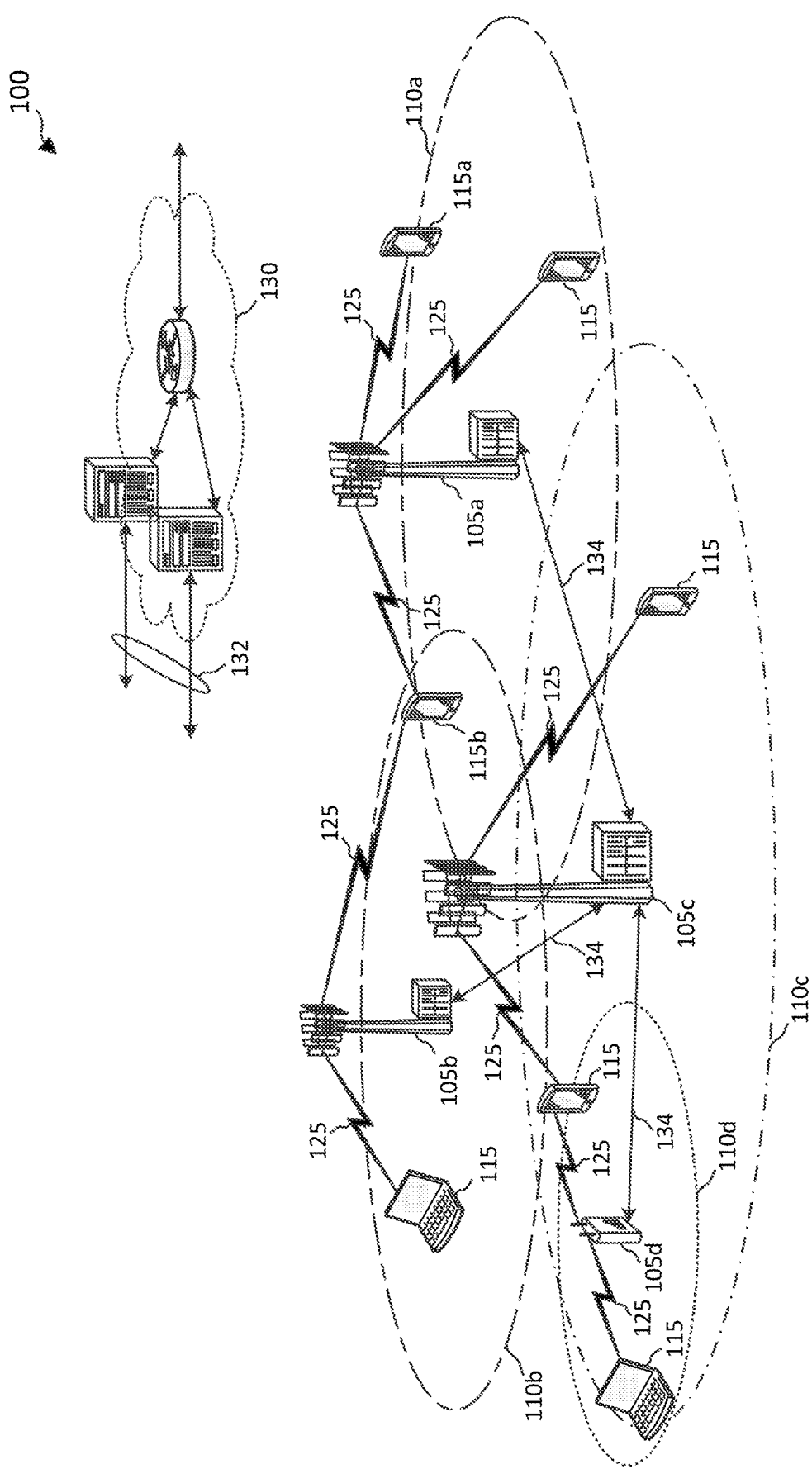
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present application describes mechanisms for communicating in a frequency spectrum using interlaced frequency structure and non-interlaced frequency structure based on power spectral density (PSD) parameters. The PSD parameters may be associated with a maximum PSD level or a range of PSD levels allowable in the frequency spectrum, a target transmit PSD level, and/or a power utilization factor of a transmitter. An interlaced frequency structure may include multiple sets of interlacing frequency bands. For example, a transmission signal may be transmitted in a set of frequency bands spaced apart from each other and interlaced with another set of frequency bands. The distribution of a transmit signal in a frequency domain can reduce the transmit PSD of the signal. For example, a frequency occupancy distribution factor of about 5 may allow a transmitter to increase the transmit power by about 7 decibels (dB) while maintaining the same PSD level. Thus, the distribution in the frequency domain can improve power utilization. The disclosed embodiments may further improve power utilization by employing time domain repetitions (e.g., increasing a transmission duration) in conjunction with frequency interlacing. The disclosed embodiments may further improve power utilization by reducing a SCS in conjunction with frequency interlacing to allow for a greater frequency distribution.

In an embodiment, the selection between an interlaced frequency structure and a non-interlaced frequency structure may be band-dependent. For example, a BS or a UE may select an interlaced frequency structure when communicating in a frequency band with a PSD requirement. Alternatively, a BS or a UE may select a non-interlaced frequency structure when communicating in a frequency band without a PSD requirement. The BS and the UE may have prior knowledge of the PSD requirements in various frequency bands prior to communicating in the frequency bands.

In an embodiment, the selection between an interlaced frequency structure and a non-interlaced frequency structure may be network-specific. For example, a BS may signal an interlaced frequency structure for a frequency band with a PSD requirement. Alternatively, a BS may signal a non-interlaced frequency structure for a frequency band without a PSD requirement. The signaling may be a broadcast signal to all UEs in a network.

In an embodiment, the selection between an interlaced frequency structure and a non-interlaced frequency structure may be UE-specific. For example, a BS may configure a power-limited UE with an interlaced frequency structure and configure a non-power-limited UE with a non-interlaced frequency structure. The configuration may be carried in a radio resource configuration (RRC) message.

In an embodiment, a BS may configure some random access resources with an interlaced frequency structure and some other random access resources with a non-interlaced frequency structure. A UE may choose to send a random access channel (RACH) preamble with the interlaced or non-interlaced random access resources based on a downlink pathloss measurement. In addition, the UE may perform power ramping in a random access procedure between the interlaced and non-interlaced RACH resources. For example, the UE may begin with transmitting a random access signal using a non-interlaced frequency resource with an initial transmit power. The UE may increase the transmit power for subsequent random access signal transmissions. The UE may switch to use an interlaced frequency resource when the transmit power is increased to a level exceeding a maximum PSD level allowable in a frequency band of the non-interlaced frequency resources.

Aspects of the present application can provide several benefits. For example, the use of frequency interlacing may improve power utilization at a transmitter. The band-dependent, network-specific, and/or UE-specific selections allow dynamic multiplexing of interlaced frequency channels and non-interlaced frequency channels based on PSD requirements and UEs' power utilization factors. The use of TTI bundling and/or reduced SCS provides flexibility in scheduling with power utilization consideration. The disclosed embodiments may be suitable for use in any wireless communication network with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the UEs 115 may perform transmit power control (TPC) instead of transmitting at a full power to allow for multiplexing in a frequency domain, multiplexing in a spatial domain, and/or interference management. For example, a UE 115 may reduce the transmit power to a minimum power sufficient to maintain a communication link 125 at a certain quality.

In an embodiment, the network 100 may operate over a shared channel, which may include a licensed spectrum, a shared spectrum, and/or an unlicensed spectrum, and may support dynamic medium sharing. A BS 105 or a UE 115 may reserve a transmission opportunity (TXOP) in a shared channel by transmitting a reservation signal prior to transmitting data in the TXOP. Other BSs 105 and/or other UEs 115 may listen to the channel and refrain from accessing the channel during the TXOP upon detection of the reservation signal. In some embodiments, the BSs 105 and/or the UEs 115 may coordinate with each other to perform interference management for further spectrum utilization improvements.

In an embodiment, the network 100 may operate over various frequency bands, for example, in frequency ranges between about 2 GHz to above 60 GHz. Different frequency bands may have different PSD requirements. As described above, the ETSI document EN 301 893 V2.1.1 specifies PSD requirements for various sub-6 GHz bands. For example, the frequency band between about 5150 MHz and about 5350 MHz may have a maximum allowable PSD level of about 10 dBm/MHz with TPC. The frequency band between about 5250 MHz and about 5350 MHz may have a maximum allowable PSD level of about 7 dBm/MHz without TPC. The frequency band between about 5150 MHz and about 5250 MHz may have a maximum allowable PSD level of about 10 dBm/MHz without TPC. The frequency band between about 5470 MHz and about 5725 MHz may have a maximum allowable PSD level of about 17 dBm/MHz with TPC and a maximum allowable PSD level of about 14 dBm/MHz without TPC. The ETSI draft document EN 302 567 V2.0.22 specifies a maximum EIRP and an EIRP density for 60 GHz bands. For example, a 60 GHz band may allow an EIRP density of about 13 dBm/MHz and an EIRP of about 40 dBm.

To meet a certain PSD limit in a frequency spectrum, a transmitter (e.g., the BSs 105 and the UEs 115) may employ frequency interlacing to spread a transmission signal over a wider bandwidth. For example, a transmitter may transmit a signal over multiple narrow frequency bands spaced apart from each other in a frequency bandwidth at a higher power than transmitting the signal over contiguous frequencies. In an embodiment, the BSs 105 and the UEs 115 may communicate over the various frequency bands by selecting between an interlaced frequency waveform and a non-interlaced frequency waveform depending on the PSD requirements in the frequency spectrums and/or the power utilization factors of the UEs 115. Mechanisms for selecting between the interlaced frequency waveform and the non-interlaced frequency waveform are described in greater detail herein.

Figure 2:
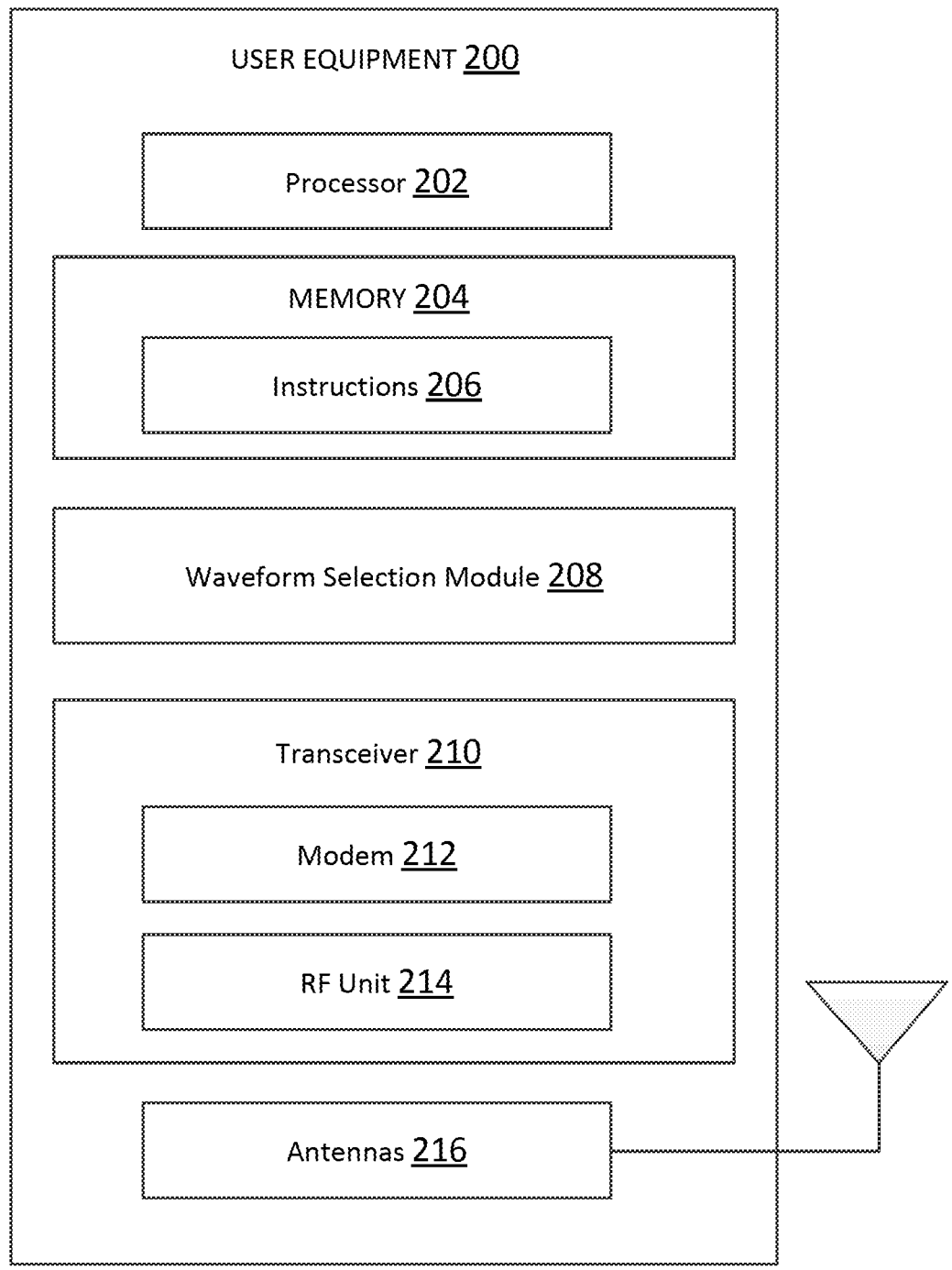
FIG. 2 is a block diagram of an exemplary user equipment (UE) according to embodiments of the present disclosure.

FIG. 2 is a block diagram of an exemplary UE 200 according to embodiments of the present disclosure. The UE 200 may be a UE 115 as discussed above. As shown, the UE 200 may include a processor 202, a memory 204, a waveform selection module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The waveform selection module 208 may be implemented via hardware, software, or combinations thereof. For example, the waveform selection module 208 may be implemented as a processor, circuit, and/or instructions 206 stored in the memory 204 and executed by the processor 202. The waveform selection module 208 may be used for various aspects of the present disclosure. For example, the waveform selection module 208 is configured to select a waveform structure between an interlaced frequency structure and a non-interlaced frequency structure for communicating in a frequency spectrum, receive waveform configurations from BSs such as the BSs 105, and/or perform power ramping with or without frequency interlacing for initial network accesses. The waveform selection module 208 may perform the selection based on a prior knowledge of a PSD requirement (e.g., a PSD limit or a range of allowable PSD levels) in a frequency spectrum, a received waveform configuration, and/or a power headroom (e.g., a power utilization factor) of the UE 200, as described in greater detail herein.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the waveform selection module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antennas 216 for transmission to one or more other devices. This may include, for example, transmission of communication signals using an interlaced frequency structure and/or a non-interlaced frequency structure according to embodiments of the present disclosure. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
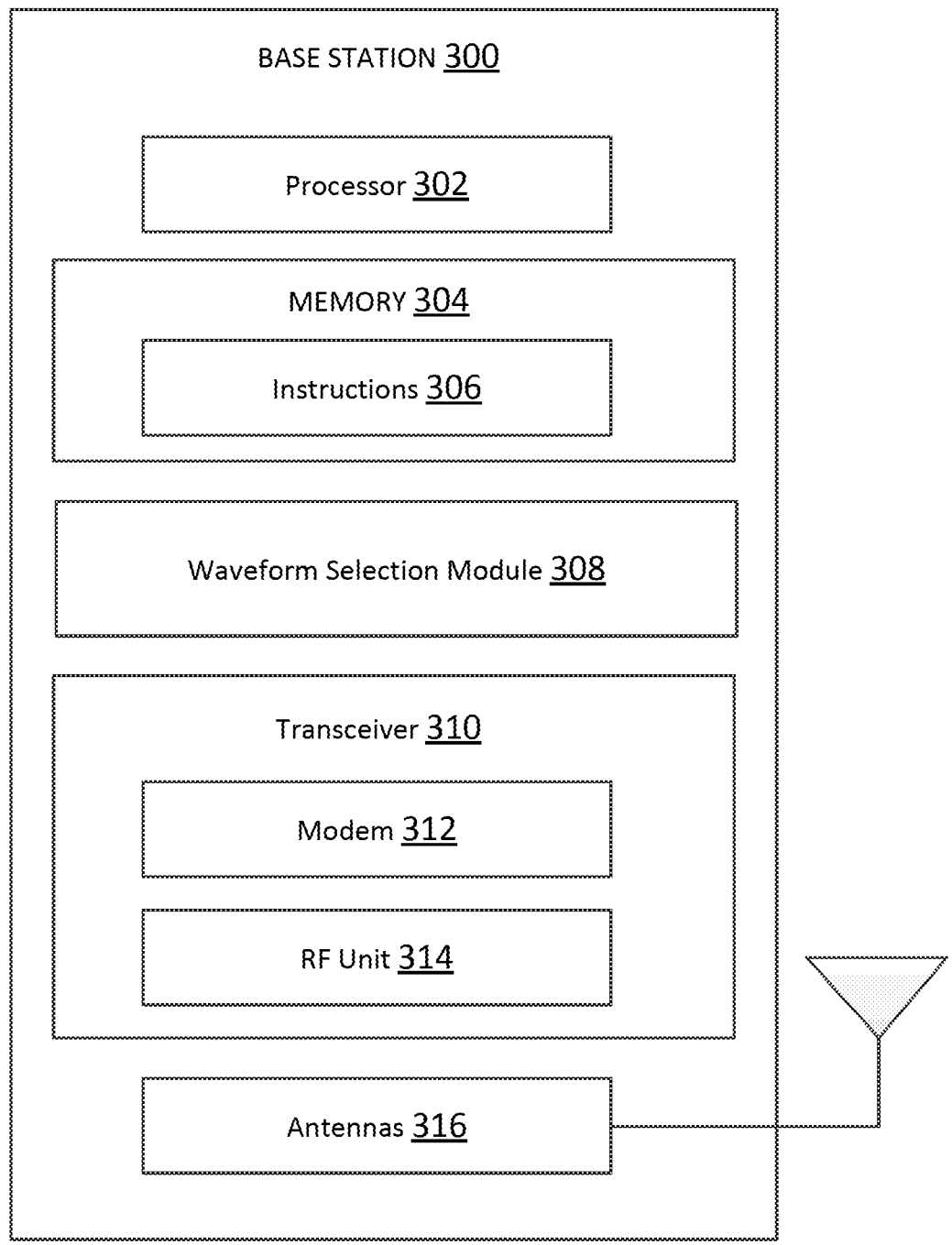
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above. A shown, the BS 300 may include a processor 302, a memory 304, a waveform selection module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. Instructions 306 may also be referred to as code, which may be interpreted broadly to include any type of computer-readable statement(s) as discussed above with respect to FIG. 3.

The waveform selection module 308 may be implemented via hardware, software, or combinations thereof. For example, the waveform selection module 308 may be implemented as a processor, circuit, and/or instructions 306 stored in the memory 304 and executed by the processor 302. The waveform selection module 308 may be used for various aspects of the present disclosure. For example, the waveform selection module 308 is configured to select a waveform structure between an interlaced frequency structure and a non-interlaced frequency structure for communicating in a frequency spectrum, determine waveform configurations for different frequency spectrums and/or different UEs such as the UEs 115, configure resources with different waveform configurations for initial network access, and/or transmit waveform configurations to UEs. The waveform selection module 308 may perform the selection and/or the determination based on a prior knowledge of a PSD requirement (e.g., a PSD limit or a range of allowable PSD levels) in a frequency spectrum and/or power headroom available in UEs, as described in greater detail herein.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc.

The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 200. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4:
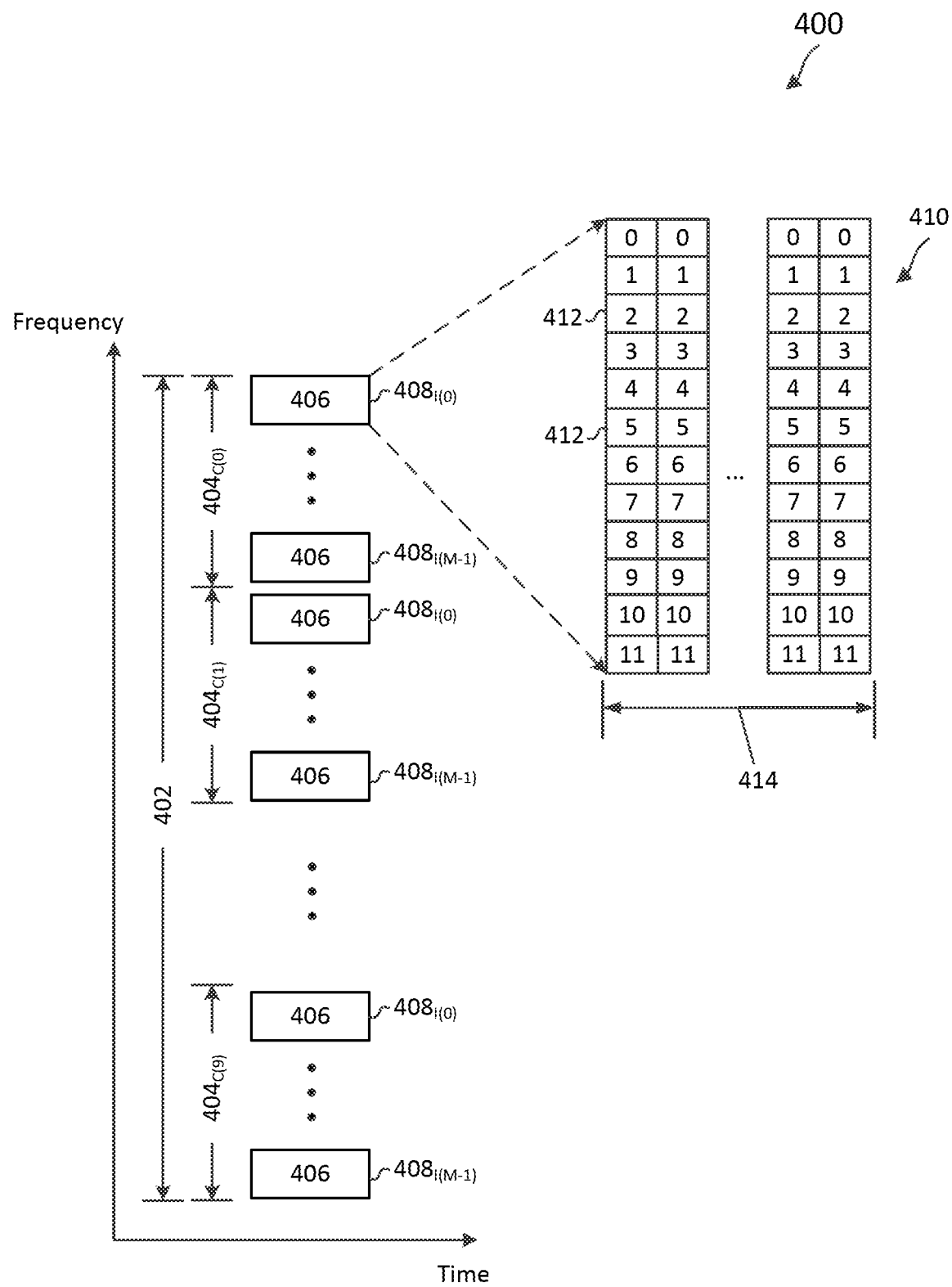
FIG. 4 illustrates a frequency interlacing scheme according to embodiments of the present disclosure.
Figure 5:
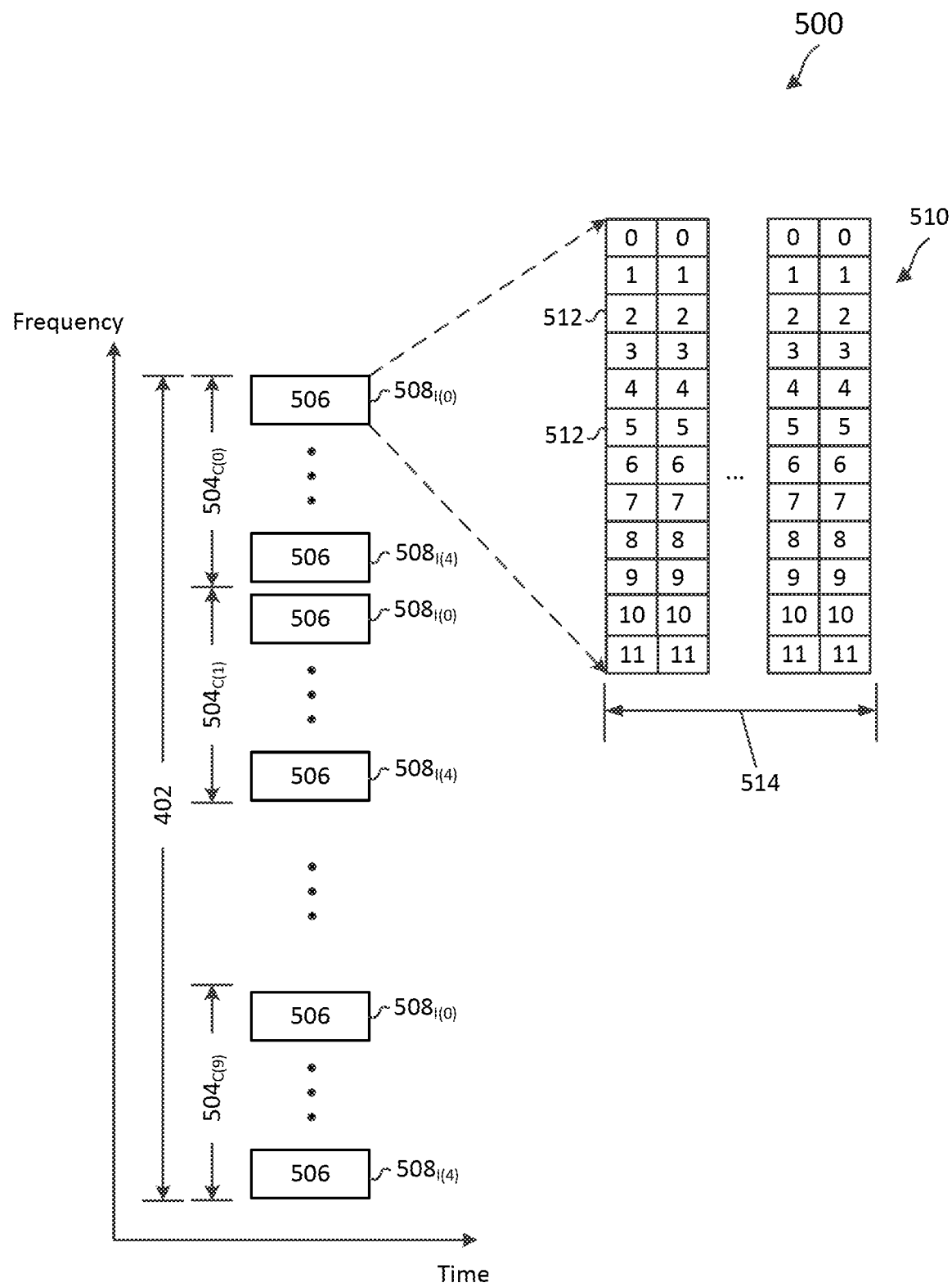
FIG. 5 illustrates a frequency interlacing scheme according to embodiments of the present disclosure.

FIGS. 4 and 5 illustrate various frequency interlacing mechanisms for distributing a transmission or a resource allocation over a frequency spectrum to improve power utilization. In FIGS. 4 and 5, the x-axes represent time in some constant units, and the y-axes represent frequency in some constant units.

FIG. 4 illustrates a frequency interlacing scheme 400 according to embodiments of the present disclosure. The scheme 400 may be employed by BSs such as the BSs 105 and 300 and UEs such as the UEs 115 and 200 to communicate over a frequency spectrum 402. The frequency spectrum 402 may have bandwidth of about 10 megahertz (MHz) or about 20 MHz and a SCS of about 15 kHz or about 30 kHz. The frequency spectrum 402 may be located at any suitable frequencies. In some embodiments, the frequency spectrum 402 may be at about 3.5 GHz, 6 GHz, or 60 GHz. The scheme 400 allocates resources in units of interlaces 408 at a resource block (RB)-granularity level.

Each interlace 408 may include ten islands 406 evenly spaced over the frequency spectrum 402. The interlaces are shown as $408_{I(0)}$ to $408_{(M-1)}$, where M is a positive integer depending on various factors, as described in greater detail herein. In an embodiment, the interlace $408_{I(k)}$ may be assigned to one UE and the interlace $408_{I(k+1)}$ may be assigned to another UE, where k may between 0 and M−2.

A group of M localized islands 406, one from each interlace 408, forms a cluster 404. As shown, the interlaces $408_{I(0)}$ to $408_{(M-1)}$ form ten clusters $404_{C(0)}$ to $404_{C(9)}$. Each island 406 includes one RB 410. Thus, the interlaces 408 have a granularity at an RB level. The RBs 410 are indexed from 0 to 11. Each RB 410 may span about twelve subcarriers 412 in frequency and a time period 414. The time period 414 may span any suitable number of OFDM symbols. In some embodiments, the time period 414 may include one transmission time interval (TTI), which may include about fourteen OFDM symbols.

While the scheme 400 is illustrated with ten clusters 404, the number of clusters may vary depending on the bandwidth of the frequency spectrum 402, the granularity of the interlaces 408, and/or the SCS of the subcarriers 412. In an embodiment, the frequency spectrum 402 may have a bandwidth of about 20 megahertz (MHz) and each subcarrier 412 may span about 15 kHz in frequency. In such an embodiment, the frequency spectrum 402 may include about ten interlaces 408 (e.g., M=10). For example, an allocation may include one interlace 408 having ten distributed RBs 410. Compared to an allocation with a single RB or ten localized RBs, the interlaced allocation with the ten distributed RBs 410 allows a UE to transmit at a higher power while maintaining the same PSD level.

In another embodiment, the frequency spectrum 402 may have a bandwidth of about 10 MHz and each subcarrier 412 may span about 15 kHz in frequency. In such an embodiment, the frequency spectrum 402 may include about five interlaces 408 (e.g., M=5). Similarly, an allocation may include one interlace 408 having ten distributed RBs. The interlaced allocation with the ten distributed RBs may allow for better power utilization than an allocation with a single RB or ten localized RBs at the same PSD level In another embodiment, the frequency spectrum 402 may have a bandwidth of about 20 MHz and each subcarrier 412 may span about 30 kHz in frequency. In such an embodiment, the frequency spectrum 402 may include about five interlaces 408 (e.g., M=5). Similarly, an allocation may include one interlace 408 having ten distributed RBs. The interlaced allocation with the ten distributed RBs may allow for better power utilization than an allocation with a single RB or ten localized RBs at the same PSD level.

The use of frequency interlacing for an allocation in the frequency spectrum 402 allows a transmitter to transmit at a higher power level than when an allocation occupies contiguous frequencies. As an example, the frequency spectrum 402 may have a maximum allowable PSD level of about 13 decibel-milliwatts per megahertz (dBm/MHz) and a transmitter (e.g., the UEs 115 and 200) may have a power amplifier (PA) capable of transmitting at about 23 dBm. Distributing frequency occupancy of an allocation with five clusters 404 may allow the transmitter to transmit at about 20 dBm (e.g., with a power boost of about 7 dB) while maintaining a PSD level of about 13 dBm/MHz. Distributing frequency occupancy of an allocation with ten clusters 404 may allow the transmitter to transmit at a full power of about 23 dBm (e.g., with a power boost of about 10 dB) while maintaining a PSD level of about 13 dBm/MHz. Thus, the use of frequency interlacing for resource allocation can provide better power utilization.

In an embodiment, the scheme 400 may be applied to a PUCCH, a PUSCH, and a physical random access channel (PRACH) to provide a power boost at a transmitter. For example, a UE may transmit a random access preamble to a BS during an initial network access over a PRACH using one interlace 408, transmit UL control information to a BS over a PUCCH using one interlace 408, and/or transmit UL data over a PUSCH using one interlace 408. In an embodiment, the scheme 400 may be applied to spectrum sharing, where a UE or a BS may transmit a medium reservation signal using an interlaced frequency structure, for example, one interlace 408, to improve medium sensing performance.

FIG. 5 illustrates a frequency interlacing scheme 500 according to embodiments of the present disclosure. The scheme 500 may be employed by BSs such as the BSs 105 and 300 and UEs such as the UEs 115 and 200 to communicate over the frequency spectrum 402. The frequency spectrum 402 may have a bandwidth of about 20 MHz and a SCS of about 60 kHz. The scheme 500 may be substantially similar to the scheme 400. For example, the scheme 500 may allocate resources in units of interlaces 508, shown as $508_{I(0)}$ to $508_{(4)}$. However, each interlace 508 may include five islands 506 evenly spaced over the frequency spectrum 402 instead of ten islands 406 evenly spaced over the frequency spectrum 402 as in the scheme 400. A group of five localized islands 506, one from each interlace 508, forms a cluster 504. As shown, the interlaces $508_{I(0)}$ to $508_{I(4)}$ form five clusters $504_{C(0)}$ to $504_{C(5)}$. Each island 506 includes one RB 510. Each RB 510 spans twelve subcarriers 512 in frequency and a time period 514. Each subcarrier 512 may span about 60 kHz in frequency. The time period 514 may include any suitable number of OFDM symbols.

The five interlaces 508 may allow a transmitter to have a power boost of about 7 dB. As an example, the frequency spectrum 402 may have a maximum allowable PSD level of about 10 dBm/MHz. The distribution of an interlace allocation into five islands 506 or five clusters 504 allows a transmitter to transmit at about 17 dBm. To further improve power utilization, the scheme 500 may apply time domain repetitions or TTI bundling, where an allocation may hop from one TTI to another TTI. For example, the time period 514 may include two TTIs (e.g., about 28 OFDM symbols) instead of one TTI (e.g., about 14 OFDM symbols) as in the scheme 400. Such TTI bundling may allow the transmitter to further increase the transmit power to about 20 dBm (e.g., an increase of about 3 dB).

While the schemes 400 and 500 illustrate resource allocations at an RB granularity level, the schemes 400 and 500 may be alternatively configured to allocate resources at a different granularity to achieve similar functionalities. For example, the islands 406 or 506 can be defined in frequency units of about 4 subcarriers instead of twelve subcarriers to provide better power utilization.

Figure 6:
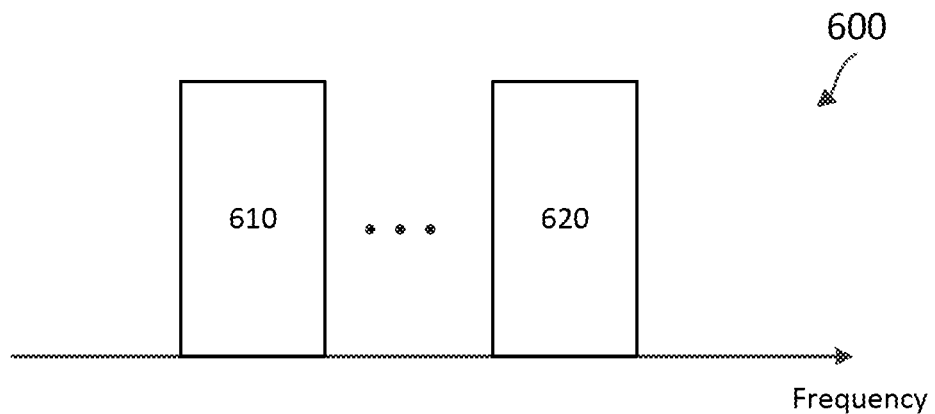
FIG. 6 illustrates a band-dependent waveform selection scheme according to embodiments of the present disclosure.
Figure 7:
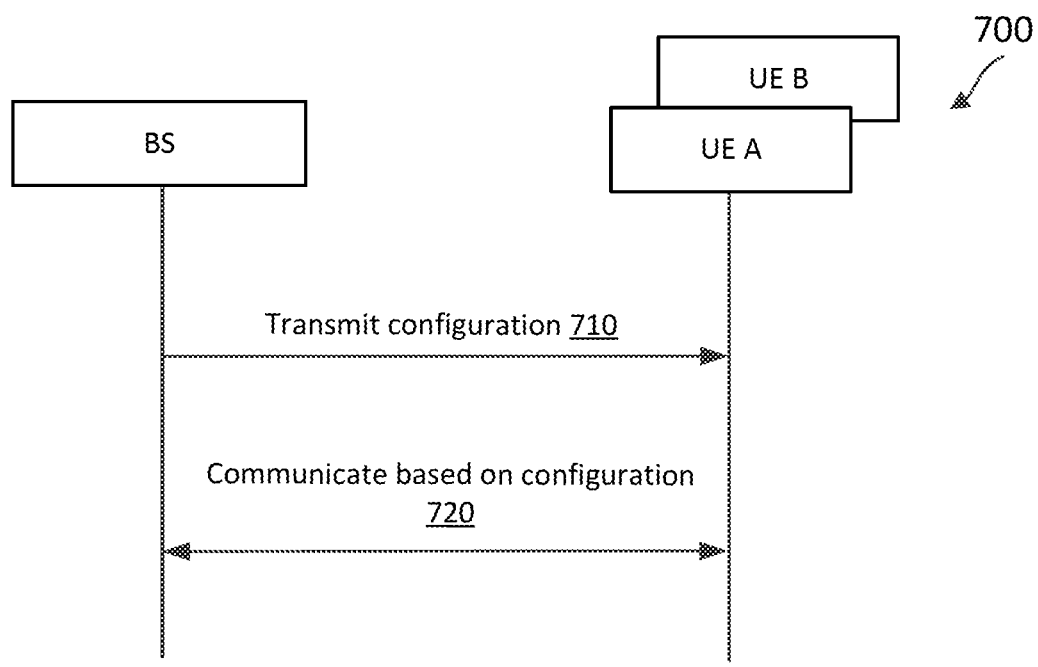
FIG. 7 is a signaling diagram of a network-specific waveform selection method according to embodiments of the present disclosure.
Figure 8:
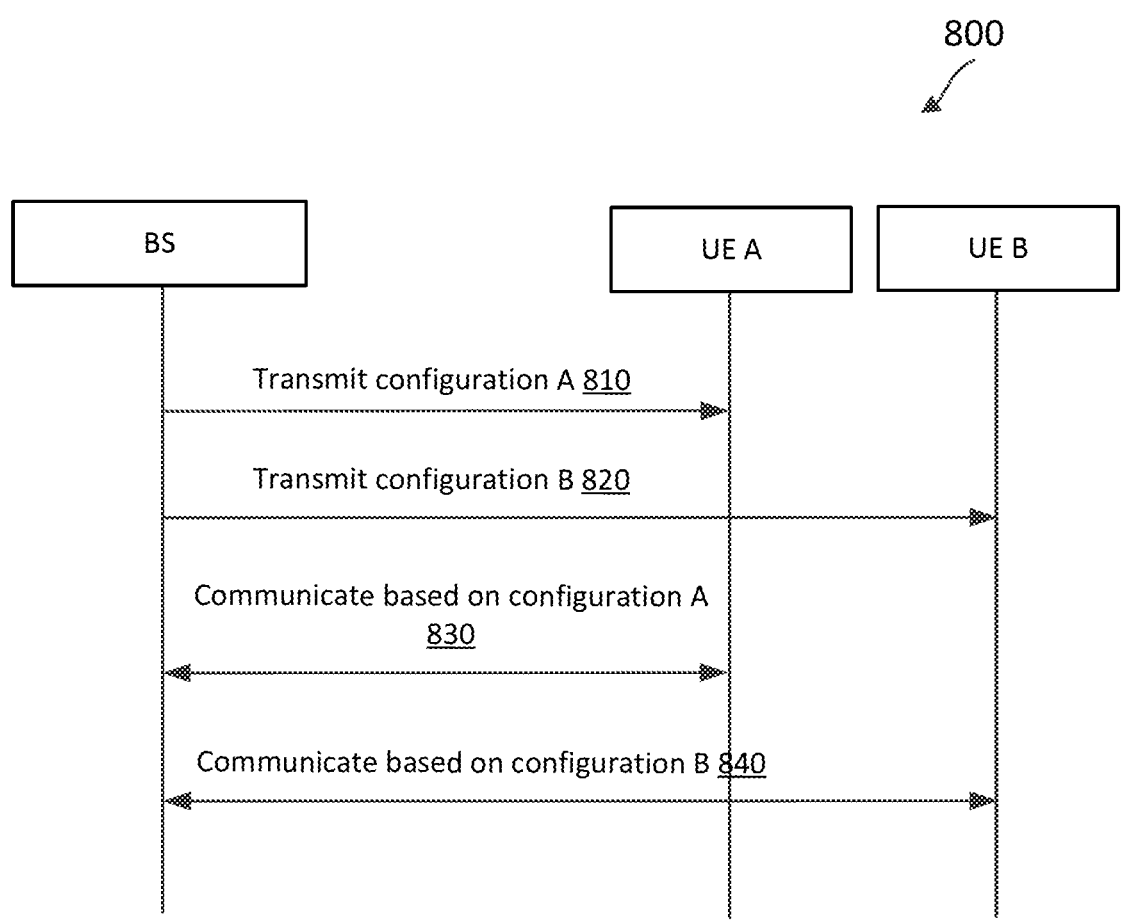
FIG. 8 is a signaling diagram of a UE-specific waveform selection method according to embodiments of the present disclosure.

FIGS. 6 to 8 illustrate various mechanisms for selecting between an interlaced frequency structure and a non-interlaced frequency structure for communicating in a frequency spectrum such as the frequency spectrum 402.

FIG. 6 illustrates a band-dependent waveform selection scheme 600 according to embodiments of the present disclosure. The x-axis represents frequency in some constant units. The scheme 600 may be employed by BSs such as the BSs 105 and 300 and UEs such as the UEs 115 and 200 to determine whether to employ an interlaced frequency structure or a non-interlaced frequency structure for communications in a frequency spectrum based on a PSD parameter of the frequency spectrum. The scheme 600 may employ similar mechanisms as described in the schemes 400 and 500 with respect to FIGS. 4 and 5, respectively, when using an interlaced frequency structure. In the scheme 600, BSs and UEs may have prior knowledge of PSD requirements in various frequency bands 610 and 620. The frequency bands 610 and 620 may be located at any suitable frequencies.

As an example, the frequency band 610 may have a PSD limit, whereas the frequency band 620 may not have a PSD limit. To meet the PSD limit in the frequency band 610, a BS may communicate with a UE in the frequency band 610 using an interlaced frequency structure (e.g., an interlace $408_{I(k)}$ or $508_{I(k)}$). Since the frequency band 620 does not have a PSD limit, a BS may communicate with a UE in the frequency band 620 using a non-interlaced frequency structure (e.g., including contiguous frequencies).

FIG. 7 is a signaling diagram of a network-specific waveform selection method 700 according to embodiments of the present disclosure. The method 700 is implemented among a BS, a UE A, and a UE B. The BS may be similar to the BSs 105 and 300. The UEs A and B may be similar to the UEs 115 and 200. Steps of the method 700 can be executed by computing devices (e.g., a processor, processing circuit, and/or other suitable component) of the BS and the UEs A and B. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the BS transmits a configuration indicating waveform structures for various frequency bands (e.g., the frequency bands 610 and 620). For example, the configuration may indicate an interlaced frequency structure (e.g., an interlace $408_{I(k)}$ or $508_{I(k)}$) for a frequency band with a PSD limit and may indicate a non-interlaced frequency structure (e.g., including contiguous frequencies) for a frequency band without a PSD limit. In an embodiment, the BS may broadcast the configuration in a SIB to all UEs (e.g., including the UEs A and B) in a network (e.g., the network 100).

At step 720, the BS may communicate with the UE A and the UE B according to the configuration. The UE A or the UE B may determine whether to use an interlaced frequency structure or a non-interlaced frequency structure for communicating with the BS based on the waveform structures indicated in the received configuration. When the waveform structure for a frequency band indicates an interlaced frequency structure, the BS and the UE may communicate with each other using similar mechanisms as in the scheme 400 or 500.

FIG. 8 is a signaling diagram of a UE-specific waveform selection method 800 according to embodiments of the present disclosure. The method 800 is implemented among a BS, a UE A, and a UE B. The BS may be similar to the BSs 105 and 300. The UEs A and B may be similar to the UEs 115 and 200. Steps of the method 800 can be executed by computing devices (e.g., a processor, processing circuit, and/or other suitable component) of the BS and the UEs A and B. As illustrated, the method 800 includes a number of enumerated steps, but embodiments of the method 800 may include additional steps before, after, and in between the enumerated steps. In some embodiments, one or more of the enumerated steps may be omitted or performed in a different order.

The method 800 may configure or assign transmissions per UE with an interlaced frequency structure or a non-interlaced frequency structure based on power headroom reports received from the UEs. For example, when a UE is power-limited, the BS may schedule a transmission (e.g., a PUSCH transmission) for the UE with an interlaced frequency structure. A UE is power-limited when the required transmit power for a UL transmission in a particular communication channel or link exceeds an available transmit power of the UE. Alternatively, when a UE is not power-limited, the BS may schedule a transmission for the UE with a non-interlaced frequency structure.

At step 810, the BS transmits a configuration A indicating a waveform structure for the UE A. For example, the UE A is power-limited, and thus the waveform structure may indicate an interlaced frequency structure (e.g., an interlace $408_{I(k)}$ or $508_{I(k)}$).

At step 820, the BS transmits a configuration B indicating a waveform structure for the UE B. For example, the UE B is not power-limited, and thus the waveform structure may indicate a non-interlaced frequency structure (e.g., including contiguous frequencies).

At step 830, the BS may communicate with the UE A based on the configuration A, for example, using the interlaced frequency structure.

At step 840, the BS may communicate with the UE B based on the configuration B, for example, using the non-interlaced frequency structure.

In an embodiment, the BS may select an interlaced frequency structure or a non-interlaced frequency structure for a UE based on a power headroom of the UE and a PSD parameter (e.g., a PSD limit or a range of allowable PSD levels) of a frequency band. For example, the BS may schedule the UE A with an interlaced frequency structure in one frequency band and a non-interlaced frequency structure in another frequency band. Alternatively, the BS may schedule the UE A with an interlaced frequency structure in one time period and a non-interlaced frequency structure in another time period.

Figure 9:
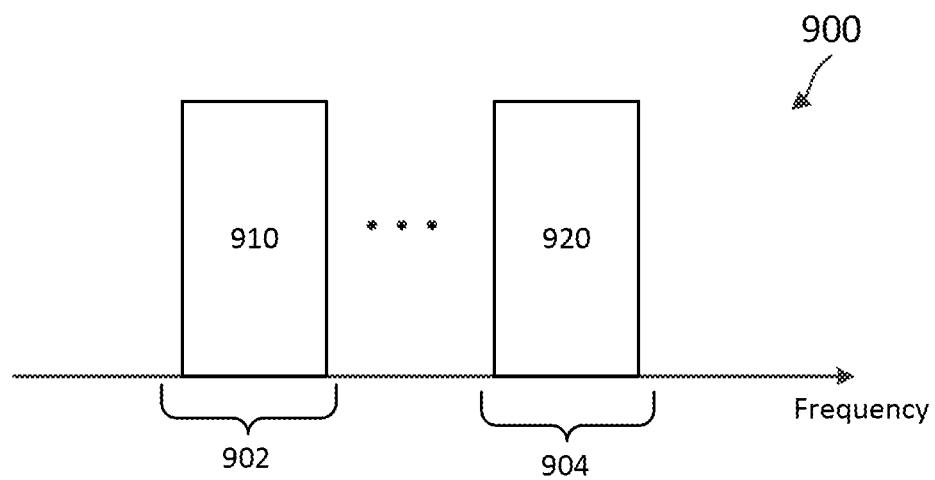
FIG. 9 illustrates a random access transmission scheme according to embodiments of the present disclosure.
Figure 10:
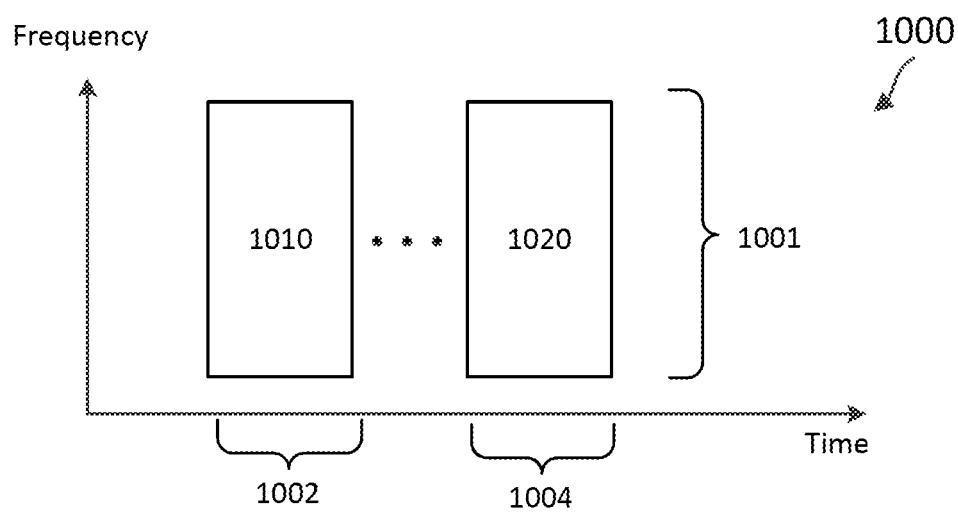
FIG. 10 illustrates a random access transmission scheme according to embodiments of the present disclosure.

FIGS. 9 and 10 illustrate various mechanisms for configuring random access resources with an interlaced frequency structure and a non-interlaced frequency structure.

FIG. 9 illustrates a random access transmission scheme 900 according to embodiments of the present disclosure. The x-axis represents frequency in some constant units. The scheme 900 may be employed by BSs such as the BSs 105 and 300 and UEs such as the UEs 115 and 200. In the scheme 900, a BS may configure multiple sets of random access resources in different frequency bands. For example, one set of random access resources 910 may be located in a frequency band 902 and may have an interlaced frequency structure (e.g., an interlace $408_{I(k)}$ or $508_{I(k)}$). Another set of random access resources 920 may be located in a frequency band 904 and may have a non-interlaced frequency structure (e.g., including contiguous frequencies). A UE may autonomously select resources from the resources 910 in the frequency band 902 or from the resources 920 in the frequency band 904 for transmitting a random access signal. The BS may monitor for a random access signal in the resources 910 based on the interlaced frequency structure and in the resources 920 based on the non-interlaced frequency structure.

In an embodiment, the selection may be based on a DL path loss measurement. When a UE is power-limited, the UE may select resources from the resources 910 with the interlaced frequency structure for better power utilization. For example, the UE may transmit a random access preamble in a frequency interlaced channel similar to the interlaces 408 and 508. Conversely, when a UE is not power-limited, the UE may select resources from the resources 920 with the non-interlaced frequency structure. For example, the UE may transmit a random access preamble in contiguous frequencies.

In an embodiment, a UE may perform power ramping during a random access procedure. For example, at the beginning of a random access procedure, the UE may select a resource from the resources 920 with the non-interlaced frequency structure for a random access preamble transmission. When no random access response is received, the UE may increase the transmit power for a subsequent random access transmission. When the transmit power reaches a maximum PSD level allowable in the frequency band 904, the UE may switch to select a resource from the resources 910 with the interlaced frequency structure for a subsequent random access preamble transmission.

FIG. 10 illustrates a random access transmission scheme 1000 according to embodiments of the present disclosure. The x-axis represents time in some constant units. The y-axis represents frequency in some constant units. The scheme 1000 may be employed by BSs such as the BSs 105 and 300 and UEs such as the UEs 115 and 200. The scheme 1000 may be substantially similar to the scheme 900. However, a BS may configure multiple sets of random access resources in different time periods instead of different frequency bands as in the scheme 900. For example, one set of random access resources 1010 may be located in a time period 1002 and may have an interlaced frequency structure (e.g., an interlace $408_{I(k)}$ or $508_{I(k)}$). Another set of random access resources 1020 may be located in a time period 1004 and may have a non-interlaced frequency structure (e.g., including contiguous frequencies). In an embodiment, resources 1010 and 1020 are located in the same frequency band 1001.

Similar to the scheme 900, a UE may autonomously select resources from the resources 1010 in the time period 1002 or from the resources 1020 in the time period 1004 for transmitting a random access signal. The selection may be based on a DL path loss measurement, a power utilization factor (e.g., a power headroom) of the UE, and/or a transmit power used for the random access preamble transmission as described in the scheme 900. The BS may monitor for a random access signal in the resources 1010 based on the interlaced frequency structure and in the resources 1020 based on the non-interlaced frequency structure.

Figure 11:
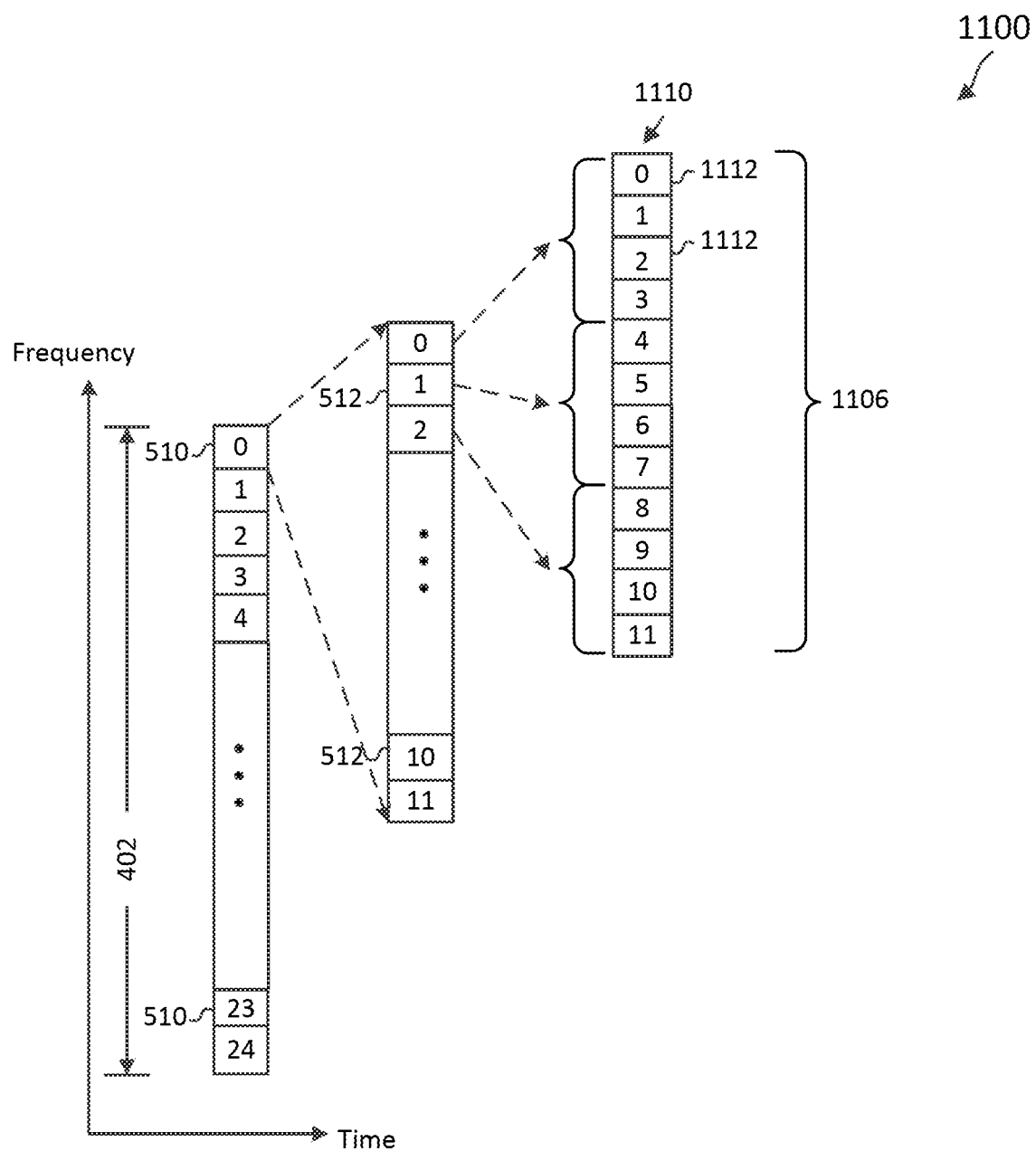
FIG. 11 illustrates a frequency interlacing scheme with a reduced subcarrier spacing (SCS) according to embodiments of the present disclosure.

FIG. 11 illustrates a frequency interlacing scheme 1100 with a reduced SCS according to embodiments of the present disclosure. The scheme 1100 may be employed by BSs such as the BSs 105 and 300 and UEs such as the UEs 115 and 200 to communicate over a frequency spectrum 402. The scheme 1100 may be substantially similar to the schemes 400 and 500, but may allocate resources at a reduced SCS.

The frequency spectrum 402 may have a bandwidth of about 20 MHz and a SCS of about 60 kHz. Thus, the frequency spectrum 402 includes twenty-five RBs 510 (e.g., indexed from 0 to 24). As described above with respect to FIG. 5, when allocating resources in units of interlaces 508 at an RB-granularity level, the scheme 500 may provide a power boost of about 7 dB without the TTI bundling. Instead of further improving power utilization using TTI bundling, the scheme 1100 applies frequency interlacing at a reduced SCS.

The scheme 1100 divides each subcarrier 512 into about four subcarriers 1112. Thus, each subcarrier 1112 spans about 15 kHz. For example, the subcarrier 512 indexed 0 is divided into four subcarriers 1112 indexed 0 to 3, the subcarrier 512 indexed 1 is divided into four subcarriers 1112 indexed 4 to 7, and the subcarrier 512 indexed 2 is divided into four subcarriers 1112 indexed 8 to 11. The group of 12 subcarriers 1112 forms a RB 1110.

Similar to the schemes 400 and 500, the scheme 1100 may allocate resources in units of interlaces similar to the interlaces 408 and 508. For example, each interlace may include about ten islands 1106 evenly spaced over the spectrum 402, where each island 1106 includes one RB 1110. Thus, the frequency spectrum may include about ten interlaces. The distribution of an allocation's frequency occupancy into ten islands 1106 can provide a power boost of about 10 dB. Alternatively, the scheme 1100 may divide each subcarrier 512 into about two subcarriers, each spanning about 30 kHz. The reduced SCS can distribute an allocation in a frequency domain to allow a transmitter to transmit at a higher power while maintaining a certain PSD level.

In an embodiment, the reduced SCS can increase computational complexity. For example, under normal operation with a bandwidth of 20 MHz and a SCS of about 60 kHz, a 512-point Fast Fourier transform (FFT) may be applied. However, reducing the SCS to about 15 kHz, a 2048-point FFT may be required. The larger FFT-size may increase the computational complexity. One approach to reducing the computational complexity is to segment the 20 MHz bandwidth into about four segments and apply four 512-point FFTs, one for each segment.

In an embodiment, communications in a frequency spectrum below about 6 GHz may use an interlaced frequency waveform structure and communications in a frequency spectrum above about 6 GHz may use an interlaced frequency waveform structure and a non-interlaced frequency waveform structure. For example, the schemes 400, 500, and 1100 described with respect to 4, 5, and 11, respectively, may be used for the interlaced frequency-based communications. The schemes 600, 900, and 1000 and the methods 700 and 800 described with respect to FIGS. 6, 9, 10, 7, and 8, respectively, may be used to select between the interlaced frequency waveform structure and the non-interlaced frequency waveform structure for communications above 6 GHz.

Figure 12:
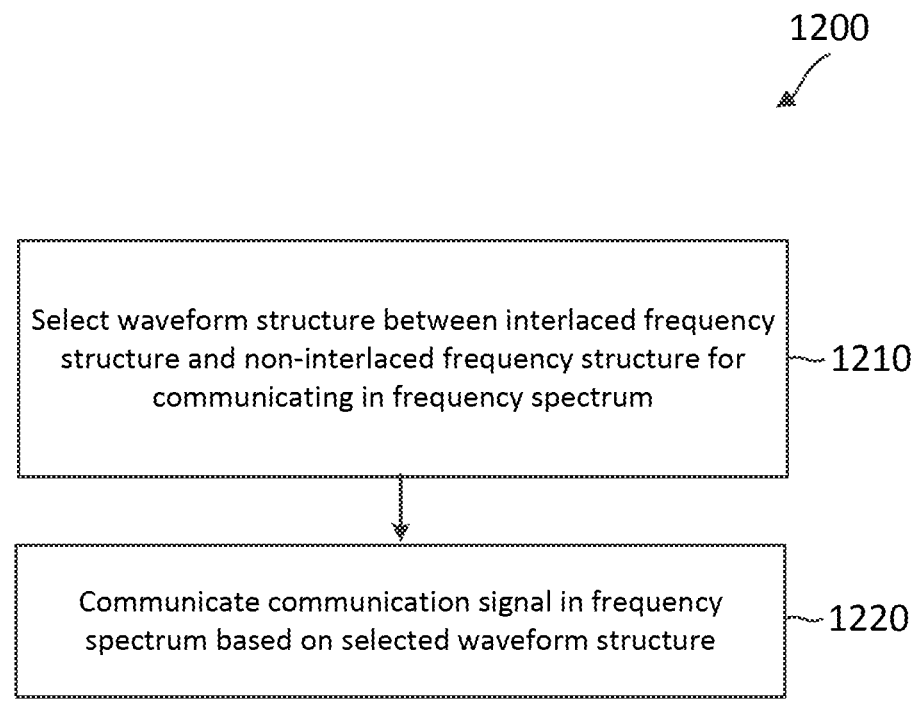
FIG. 12 is a flow diagram of a communication method with a waveform selection according to embodiments of the present disclosure.

FIG. 12 is a flow diagram of a communication method 1200 with a waveform selection according to embodiments of the present disclosure. Steps of the method 1200 can be executed by a computing device (e.g., a processor, processing circuit, and/or other suitable component) of a wireless communication device, such as the BSs 105 and 300 and the UEs 115 and 200. The method 1200 may employ similar mechanisms as in the schemes 400, 500, 600, 900, and 1000 and the methods 700 and 800 described with respect to FIGS. 4, 5, 6, 9, 10, 7, and 8, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes selecting, by a first wireless communication device, a waveform structure between an interlaced frequency structure and a non-interlaced frequency structure for communicating in a frequency spectrum (e.g., the frequency spectrum 402). The interlaced frequency structure may include at least a first set of frequency bands (e.g., the interlace $408_{I(0)}$ or $508_{I(0)}$) in the spectrum. The first set of frequency bands interlaces with a second set of frequency bands (e.g., the interlace $408_{I(1)}$ or $508_{I(1)}$) in the frequency spectrum. The non-interlaced frequency structure may include one or more contiguous frequency bands, RBs, or in the frequency spectrum. The selection may be band-dependent as described in the scheme 600, network-specific as described in the method 700, or UE-specific as described in the method 800.

At step 1220, the method 1200 includes communicating, by the first wireless communication device with a second wireless communication device, a communication signal in the frequency spectrum based on the selected waveform structure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication comprising selecting, by a first wireless communication device, a waveform structure between an interlaced frequency structure and a non-interlaced frequency structure for communicating in a frequency spectrum; and communicating, by the first wireless communication device with a second wireless communication device in the frequency spectrum, a communication signal based on the selected waveform structure.

In some embodiments, wherein the interlaced frequency structure includes at least a first set of frequency bands in the frequency spectrum, the first set of frequency bands interlacing with a second set of frequency bands in the frequency spectrum, and wherein the non-interlaced frequency structure includes one or more contiguous frequency bands in the frequency spectrum. In some embodiments, wherein the selecting is based on a power spectral density (PSD) parameter of the frequency spectrum. In some embodiments, wherein the PSD parameter is associated with a PSD requirement in the frequency spectrum, and wherein the selecting includes determining whether the frequency spectrum has the PSD requirement; and selecting the interlaced frequency structure as the waveform structure when determining that the frequency spectrum has the PSD requirement. In some embodiments, wherein the PSD parameter is associated with a PSD requirement in the frequency spectrum, wherein the selecting is based on a first frequency band having the PSD requirement and a second frequency band not having the PSD requirement, and wherein the communicating includes communicating a first communication signal with the interlaced frequency structure in the first frequency band; and communicating a second communication signal with the non-interlaced frequency structure in the second frequency band. In some embodiments, the method further comprises transmitting, by the first wireless communication device, a configuration indicating the waveform structure for communicating in the frequency spectrum. In some embodiments, wherein the selecting is based on a power headroom of the second wireless communication device. In some embodiments, the method further comprises receiving, by the first wireless communication device from the second wireless communication device, a configuration indicating the waveform structure for communicating in the frequency spectrum, wherein the selecting is based on the configuration. In some embodiments, the method further comprises communicating, by the first wireless communication device with the second wireless communication device, a configuration indicating a first set of random access resources having a interlaced frequency structure and a second set of random access resources having a non-interlaced frequency structure; and communicating, by the first wireless communication device with the second wireless communication device, a random access signal based on the configuration. In some embodiments, wherein the first set of random access resources and the second set of random access resources are in different frequency bands within the frequency spectrum. In some embodiments, wherein the first set of random access resources and the second set of random access resources are in different time periods. In some embodiments, wherein the communicating the configuration includes transmitting, by the first wireless communication device to the second wireless communication device, the configuration, and wherein the communicating the random access signal includes monitoring, by the first wireless communication device, for the random access signal. In some embodiments, wherein the communicating the configuration includes receiving, by the first wireless communication device from the second wireless communication device, the configuration. In some embodiments, the method further comprises determining, by the first wireless communication device, whether to transmit the random access signal to the second wireless communication device using the first set of random access resources or the second set of random access resources based on at least one of the configuration, a power headroom of the second wireless communication device, or a power utilization factor of the second wireless communication device. In some embodiments, wherein the communicating the random access signal includes transmitting, by the first wireless communication device to the second wireless communication device using the second set of random access resources, a first random access signal with the non-interlaced frequency structure at a first transmit power; and transmitting, by the first wireless communication device to the second wireless communication device using the first set of random access resources, a second random access signal with the interlaced frequency structure at a second transmit power greater than the first transmit power. In some embodiments, the method further comprises determining, by the first wireless communication device, to transmit the second random access signal with the interlaced frequency structure using the first set of random access resources based on a comparison between the second transmit power and a power spectral density (PSD) parameter of a frequency band of the second set of random access resources. In some embodiments, wherein the frequency spectrum includes a first subcarrier spacing for the non-interlaced frequency structure, wherein the communicating the communication signal includes communicating the communication signal using a second subcarrier spacing for the interlaced frequency structure, and wherein the first subcarrier spacing is greater than the second subcarrier spacing.

Further embodiments of the present disclosure include an apparatus comprising a processor configured to select a waveform structure between an interlaced frequency structure and a non-interlaced frequency structure for communicating in a frequency spectrum; and a transceiver configured to communicate, with a second wireless communication device in the frequency spectrum, a communication signal based on the selected waveform structure.

In some embodiments, wherein the interlaced frequency structure includes at least a first set of frequency bands in the frequency spectrum, the first set of frequency bands interlacing with a second set of frequency bands in the frequency spectrum, and wherein the non-interlaced frequency structure includes one or more contiguous frequency bands in the frequency spectrum. In some embodiments, wherein the processor is further configured to select the waveform structure based on a power spectral density (PSD) parameter of the frequency spectrum. In some embodiments, wherein the PSD parameter is associated with a PSD requirement in the frequency spectrum, and wherein the processor is further configured to select the waveform structure by determining whether the frequency spectrum has a PSD requirement; and selecting the interlaced frequency structure as the waveform structure when determining that the frequency spectrum has the PSD requirement. In some embodiments, wherein the PSD parameter is associated with a PSD requirement in the frequency spectrum, wherein the processor is further configured to select the waveform structure based on a first frequency band having the PSD requirement and a second frequency band not having the PSD requirement, and wherein the transceiver is further configured to communicate a first communication signal with the interlaced frequency structure in the first frequency band; and communicate a second communication signal with the non-interlaced frequency structure in the second frequency band. In some embodiments, wherein the transceiver is further configured to transmit a configuration indicating the waveform structure for communicating in the frequency spectrum. In some embodiments, wherein the processor is further configured to select the waveform structure based on a power headroom of the second wireless communication device. In some embodiments, wherein the transceiver is further configured to receive, from the second wireless communication device, a configuration indicating the waveform structure for communicating in the frequency spectrum, and wherein the processor is further configured to select the waveform structure based on the configuration. In some embodiments, wherein the transceiver is further configured to communicate, with the second wireless communication device, a configuration indicating a first set of random access resources having an interlaced frequency structure and a second set of random access resources having a non-interlaced frequency structure; and communicate, with the second wireless communication device, a random access signal based on the configuration. In some embodiments, wherein the first set of random access resources and the second set of random access resources are in different frequency bands within the frequency spectrum. In some embodiments, wherein the first set of random access resources and the second set of random access resources are in different time periods. In some embodiments, wherein the transceiver is further configured to communicate the configuration by transmitting, to the second wireless communication device, the configuration; and communicate the random access signal by monitoring for the random access signal. In some embodiments, wherein the transceiver is further configured to communicate the configuration by receiving, from the second wireless communication device, the configuration. In some embodiments, wherein the processor is further configured to determine whether to transmit the random access signal to the second wireless communication device using the first set of random access resources or the second set of random access resources based on at least one of the configuration, a power headroom of the second wireless communication device, or a power utilization factor of the second wireless communication device. In some embodiments, wherein the transceiver is further configured to communicate the random access signal by transmitting, to the second wireless communication device using the second set of random access resources, a first random access signal with the non-interlaced frequency structure at a first transmit power; and transmitting, to the second wireless communication device using the first set of random access resources, a second random access signal with the interlaced frequency structure at a second transmit power greater than the first transmit power. In some embodiments, wherein the processor is further configured to determine to transmit the second random access signal with the interlaced frequency structure using the first set of random access resources based on a comparison between the second transmit power and a power spectral density (PSD) parameter of a frequency band of the second set of random access resources. In some embodiments, wherein the frequency spectrum includes a first SCS for the non-interlaced frequency structure, wherein the transceiver is further configured to communicate the communication signal by communicating the communication signal using a second SCS for the interlaced frequency structure, and wherein the first SCS is greater than the second SCS.

Further embodiments of the present disclosure include a computer-readable medium having program code recorded thereon, the program code comprising code for causing a first wireless communication device to select a waveform structure between an interlaced frequency structure and a non-interlaced frequency structure for communicating in a frequency spectrum; and code for causing the first wireless communication device to communicate, with a second wireless communication device in the frequency spectrum, a communication signal based on the selected waveform structure.

In some embodiments, wherein the interlaced frequency structure includes at least a first set of frequency bands in the frequency spectrum, the first set of frequency bands interlacing with a second set of frequency bands in the frequency spectrum, and wherein the non-interlaced frequency structure includes one or more contiguous frequency bands in the frequency spectrum. In some embodiments, wherein the code for causing the first wireless communication device to select the waveform structure is further configured to select the waveform structure based on a power spectral density (PSD) parameter of the frequency spectrum. In some embodiments, wherein the PSD parameter is associated with a PSD requirement in the frequency spectrum, and wherein the code for causing the first wireless communication device to select the waveform structure is further configured to select the waveform structure by determining whether the frequency spectrum has the PSD requirement; and selecting the interlaced frequency structure as the waveform structure when determining that the frequency spectrum has the PSD requirement. In some embodiments, wherein the PSD parameter is associated with a PSD requirement in the frequency spectrum, wherein the code for causing the first wireless communication device to select the waveform structure is further configured to select the waveform structure based on a first frequency band having the PSD requirement and a second frequency band not having the PSD requirement, and wherein the code for causing the first wireless communication device to communicate the communication signal is further configured to communicate the communicate signal by communicating a first communication signal with the interlaced frequency structure in the first frequency band; and communicating a second communication signal with the non-interlaced frequency structure in the second frequency band. In some embodiments, the computer-readable medium further comprises code for causing the first wireless communication device to transmit a configuration indicating the waveform structure for communicating in the frequency spectrum. In some embodiments, wherein the code for causing the first wireless communication device to select the waveform structure is further configured to select the waveform structure based on a power headroom of the second wireless communication device. In some embodiments, the computer-readable medium further comprises code for causing the first wireless communication device to receive, from the second wireless communication device, a configuration indicating the waveform structure for communicating in the frequency spectrum, wherein the code for causing the first wireless communication device to select the waveform structure is further configured to select the waveform structure based on the configuration. In some embodiments, the computer-readable medium further comprises code for causing the first wireless communication device to communicate, with the second wireless communication device, a configuration indicating a first set of random access resources having an interlaced frequency structure and a second set of random access resources having a non-interlaced frequency structure; and code for causing the first wireless communication device to communicate, with the second wireless communication device, a random access signal based on the configuration. In some embodiments, wherein the first set of random access resources and the second set of random access resources are in different frequency bands within the frequency spectrum. In some embodiments, wherein the first set of random access resources and the second set of random access resources are in different time periods. In some embodiments, wherein the code for causing the first wireless communication device to communicate the configuration is further configured to transmit, to the second wireless communication device, the configuration, and wherein the code for causing the first wireless communication device to communicate the random access signal is further configured to monitor for the random access signal. In some embodiments, wherein the code for causing the first wireless communication device to communicate the configuration is further configured to receive, from the second wireless communication device, the configuration. In some embodiments, the computer-readable medium further comprises code for causing the first wireless communication device to determine whether to transmit the random access signal to the second wireless communication device using the first set of random access resources or the second set of random access resources based on at least one of the configuration, a power headroom of the second wireless communication device, or a power utilization factor of the second wireless communication device. In some embodiments, wherein the code for causing the first wireless communication device to communicate the random access signal is further configured to transmit, to the second wireless communication device using the second set of random access resources, a first random access signal with the non-interlaced frequency structure at a first transmit power; and transmit, to the second wireless communication device using the first set of random access resources, a second random access signal with the interlaced frequency structure at a second transmit power greater than the first transmit power. In some embodiments, the computer-readable medium further comprises code for causing the first wireless communication device to determine to transmit the second random access signal with the interlaced frequency structure using the first set of random access resources based on a comparison between the second transmit power and a power spectral density (PSD) parameter of a frequency band of the second set of random access resources. In some embodiments, wherein the frequency spectrum includes a first SCS for the non-interlaced frequency structure, wherein the code for causing the first wireless communication device to communicate the communication signal is further configured to communicate the communication signal using a second SCS for the interlaced frequency structure, and wherein the first SCS is greater than the second SCS.

Further embodiments of the present disclosure include an apparatus comprising means for selecting a waveform structure between an interlaced frequency structure and a non-interlaced frequency structure for communicating in a frequency spectrum; and means for communicating, with a second wireless communication device in the frequency spectrum, a communication signal based on the selected waveform structure.

In some embodiments, wherein the interlaced frequency structure includes at least a first set of frequency bands in the frequency spectrum, the first set of frequency bands interlacing with a second set of frequency bands in the frequency spectrum, and wherein the non-interlaced frequency structure includes one or more contiguous frequency bands in the frequency spectrum. In some embodiments, wherein the means for selecting the waveform structure is further configured to select the waveform structure based on a power spectral density (PSD) parameter of the frequency spectrum. In some embodiments, wherein the PSD parameter is associated with a PSD requirement in the frequency spectrum, and wherein the means for selecting the waveform structure is further configured to select the waveform structure by determining whether the frequency spectrum has the PSD requirement; and selecting the interlaced frequency structure as the waveform structure when determining that the frequency spectrum has the PSD requirement. In some embodiments, wherein the PSD parameter is associated with a PSD requirement in the frequency spectrum, wherein the means for selecting the waveform structure is further configured to select the waveform structure based on a first frequency band having the PSD requirement and a second frequency band not having the PSD requirement, and wherein the means for communicating the communication signal is further configured to communicate a first communication signal with the interlaced frequency structure in the first frequency band; and communicate a second communication signal with the non-interlaced frequency structure in the second frequency band. In some embodiments, the apparatus further comprises means for transmitting a configuration indicating the waveform structure for communicating in the frequency spectrum. In some embodiments, wherein the means for selecting the waveform structure is further configured to select the waveform structure based on a power headroom of the second wireless communication device. In some embodiments, the apparatus further comprises means for receiving, from the second wireless communication device, a configuration indicating the waveform structure for communicating in the frequency spectrum, wherein the means for selecting the waveform structure is further configured to select the waveform structure based on the configuration. In some embodiments, the apparatus further comprises means for communicating, with the second wireless communication device, a configuration indicating a first set of random access resources having an interlaced frequency structure and a second set of random access resources having a non-interlaced frequency structure; and means for communicating, with the second wireless communication device, a random access signal based on the configuration. In some embodiments, wherein the first set of random access resources and the second set of random access resources are in different frequency bands within the frequency spectrum. In some embodiments, wherein the first set of random access resources and the second set of random access resources are in different time periods. In some embodiments, wherein the means for communicating the configuration is further configured to transmit, to the second wireless communication device, the configuration, and wherein the means for communicating the random access signal is further configured to monitor for the random access signal. In some embodiments, wherein the means for communicating the configuration is further configured to receive, from the second wireless communication device, the configuration. In some embodiments, the apparatus further comprises means for determining whether to transmit the random access signal to the second wireless communication device using the first set of random access resources or the second set of random access resources based on at least one of the configuration, a power headroom of the second wireless communication device, or a power utilization factor of the second wireless communication device. In some embodiments, wherein the means for communicating the random access signal is further configured to transmit, to the second wireless communication device using the second set of random access resources, a first random access signal with the non-interlaced frequency structure at a first transmit power; and transmit, to the second wireless communication device using the first set of random access resources, a second random access signal with the interlaced frequency structure at a second transmit power greater than the first transmit power. In some embodiments, the apparatus further comprises means for determining to transmit the second random access signal with the interlaced frequency structure using the first set of random access resources based on a comparison between the second transmit power and a power spectral density (PSD) parameter of a frequency band of the second set of random access resources. In some embodiments, wherein the frequency spectrum includes a first SCS for the non-interlaced frequency structure, wherein the means for communicating the communication signal is further configured to communicate the communication signal using a second SCS for the interlaced frequency structure, and wherein the first SCS is greater than the second SCS.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:
1. A method of wireless communication, comprising:
selecting, by a first wireless communication device, an interlaced frequency structure for communicating in a first frequency band of a frequency spectrum based on a power spectral density (PSD) parameter of the fre- quency spectrum, wherein selecting the interlaced frequency structure based on the PSD parameter of the frequency spectrum comprises selecting between the interlaced frequency structure and a non-interlaced frequency structure based on the PSD parameter;

communicating, by the first wireless communication device with a second wireless communication device in the first frequency band of the frequency spectrum, a first communication signal using a lower subcarrier spacing (SCS) for the selected interlaced frequency structure; and communicating, by the first wireless communication device with the second wireless communication device in a second frequency band of the frequency spectrum, a second communication signal using a greater SCS for the non-interlaced frequency structure.

2. The method of claim 1, wherein the interlaced frequency structure includes at least a first set of frequency bands in the frequency spectrum, the first set of frequency bands interlacing with a second set of frequency bands in the frequency spectrum, and wherein the non-interlaced frequency structure includes one or more contiguous frequency bands in the frequency spectrum.

3. The method of claim 1, wherein the PSD parameter is associated with a PSD requirement in the frequency spectrum, and wherein the selecting includes:
   determining whether the frequency spectrum has the PSD requirement; and
   selecting the interlaced frequency structure for communicating in the first frequency band when determining that the frequency spectrum has the PSD requirement.

4. The method of claim 1, further comprising transmitting, by the first wireless communication device, a configuration indicating the interlaced frequency structure for communicating in the first frequency band of the frequency spectrum.

5. The method of claim 4, wherein the selecting is based on a power headroom of the second wireless communication device.

6. The method of claim 1, further comprising receiving, by the first wireless communication device from the second wireless communication device, a configuration indicating the interlaced frequency structure for communicating in the first frequency band of the frequency spectrum, wherein the selecting is based on the configuration.

7. The method of claim 1, further comprising:
   communicating, by the first wireless communication device with the second wireless communication device, a configuration indicating a first set of random access resources having the interlaced frequency structure and a second set of random access resources having the non-interlaced frequency structure; and
   communicating, by the first wireless communication device with the second wireless communication device, a random access signal based on the configuration.

8. The method of claim 7, wherein the first set of random access resources and the second set of random access resources are in different frequency bands within the frequency spectrum.

9. The method of claim 7, wherein the first set of random access resources and the second set of random access resources are in different time periods.

10. The method of claim 7, wherein the communicating the configuration includes transmitting, by the first wireless communication device to the second wireless communication device, the configuration, and wherein the communicating the random access signal includes monitoring, by the first wireless communication device, for the random access signal.

11. The method of claim 7, wherein the communicating the configuration includes receiving, by the first wireless communication device from the second wireless communication device, the configuration.

12. The method of claim 11, further comprising:
   determining, by the first wireless communication device, whether to transmit the random access signal to the second wireless communication device using the first set of random access resources or the second set of random access resources based on at least one of the configuration, a power headroom of the second wireless communication device, or a power utilization factor of the second wireless communication device.

13. The method of claim 11, wherein the communicating the random access signal includes:
   transmitting, by the first wireless communication device to the second wireless communication device using the second set of random access resources, a first random access signal with the non-interlaced frequency structure at a first transmit power; and
   transmitting, by the first wireless communication device to the second wireless communication device using the first set of random access resources, a second random access signal with the interlaced frequency structure at a second transmit power greater than the first transmit power.

14. The method of claim 13, further comprising determining, by the first wireless communication device, to transmit the second random access signal with the interlaced frequency structure using the first set of random access resources based on a comparison between the second transmit power and a PSD parameter of a frequency band of the second set of random access resources.

15. The method of claim 1, wherein the frequency spectrum includes a first subcarrier spacing for the non-interlaced frequency structure, wherein the communicating the communication signal includes communicating the communication signal using a second subcarrier spacing for the interlaced frequency structure, and wherein the first subcarrier spacing is greater than the second subcarrier spacing.

16. An apparatus comprising:
   a processor configured to select, between an interlaced frequency structure and a non-interlaced frequency structure, the interlaced frequency structure for communicating in a first frequency band of a frequency spectrum based on a power spectral density (PSD) parameter of the frequency spectrum;
   a transceiver configured to:
      communicate, with a second wireless communication device in the frequency spectrum, a first communication signal using the selected interlaced frequency structure; and
      communicate, with the second wireless communication device in a second frequency band of the frequency spectrum, a second communication signal using the non-interlaced frequency structure.

17. The apparatus of claim 16, wherein the interlaced frequency structure includes at least a first set of frequency bands in the frequency spectrum, the first set of frequency bands interlacing with a second set of frequency bands in the frequency spectrum, and wherein the non-interlaced frequency structure includes one or more contiguous frequency bands in the frequency spectrum.

18. The apparatus of claim 16, wherein the PSD parameter is associated with a PSD requirement in the frequency spectrum, and wherein the processor is further configured to select the interlaced frequency structure by:
   determining whether the frequency spectrum has the PSD requirement; and
   selecting the interlaced frequency structure for communicating in the first frequency band when determining that the frequency spectrum has the PSD requirement.

19. The apparatus of claim 16, wherein the transceiver is further configured to transmit a configuration indicating the interlaced frequency structure for communicating in the first frequency band of the frequency spectrum.

20. The apparatus of claim 19, wherein the processor is further configured to select the interlaced frequency structure based on a power headroom of the second wireless communication device.

21. The apparatus of claim 16, wherein the transceiver is further configured to receive, from the second wireless communication device, a configuration indicating the interlaced frequency structure for communicating in the first frequency band of the frequency spectrum, and wherein the processor is further configured to select the interlaced frequency structure based on the configuration.

22. The apparatus of claim 16, wherein the transceiver is further configured to:
   communicate, with the second wireless communication device, a configuration indicating a first set of random access resources having the interlaced frequency structure and a second set of random access resources having the non-interlaced frequency structure; and
   communicate, with the second wireless communication device, a random access signal based on the configuration.

23. The apparatus of claim 22, wherein the first set of random access resources and the second set of random access resources are in different frequency bands within the frequency spectrum.

24. The apparatus of claim 22, wherein the first set of random access resources and the second set of random access resources are in different time periods.

25. The apparatus of claim 22, wherein the transceiver is further configured to:
   communicate the configuration by transmitting, to the second wireless communication device, the configuration; and
   communicate the random access signal by monitoring for the random access signal.

26. The apparatus of claim 22, wherein the transceiver is further configured to communicate the configuration by receiving, from the second wireless communication device, the configuration.

27. The apparatus of claim 26, wherein the processor is further configured to determine whether to transmit the random access signal to the second wireless communication device using the first set of random access resources or the second set of random access resources based on at least one of the configuration, a power headroom of the second wireless communication device, or a power utilization factor of the second wireless communication device.

28. The apparatus of claim 26, wherein the transceiver is further configured to communicate the random access signal by:
   transmitting, to the second wireless communication device using the second set of random access resources, a first random access signal with the non-interlaced frequency structure at a first transmit power; and
   transmitting, to the second wireless communication device using the first set of random access resources, a second random access signal with the interlaced frequency structure at a second transmit power greater than the first transmit power.

29. The apparatus of claim 28, wherein the processor is further configured to determine to transmit the second random access signal with the interlaced frequency structure using the first set of random access resources based on a comparison between the second transmit power and a PSD parameter of a frequency band of the second set of random access resources.

30. The apparatus of claim 16, wherein the frequency spectrum includes a first SCS for the non-interlaced frequency structure, wherein the transceiver is further configured to communicate the communication signal by communicating the communication signal using a second SCS for the interlaced frequency structure, and wherein the first SCS is greater than the second SCS.

31. A computer-readable medium having program code recorded thereon, the program code comprising:
   code for causing a first wireless communication device to select, between an interlaced frequency structure and a non-interlaced frequency structure, the interlaced frequency structure for communicating in a first frequency band of a frequency spectrum based on a power spectral density (PSD) parameter of the frequency spectrum;
   code for causing the first wireless communication device to:
      communicate, with a second wireless communication device in the frequency spectrum, a first communication signal using the selected interlaced frequency structure; and
      communicate, with the second wireless communication device in a second frequency band of the frequency spectrum, a second communication signal using the non-interlaced frequency structure.

32. The computer-readable medium of claim 31, wherein the interlaced frequency structure includes at least a first set of frequency bands in the frequency spectrum, the first set of frequency bands interlacing with a second set of frequency bands in the frequency spectrum, and wherein the non-interlaced frequency structure includes one or more contiguous frequency bands in the frequency spectrum.

33. The computer-readable medium of claim 31, wherein the PSD parameter is associated with a PSD requirement in the frequency spectrum, and wherein the code for causing the first wireless communication device to select the interlaced frequency structure is further configured to select the interlaced frequency structure by:
   determining whether the frequency spectrum has the PSD requirement; and
   selecting the interlaced frequency structure for communicating in the first frequency band when determining that the frequency spectrum has the PSD requirement.

34. The computer-readable medium of claim 31, further comprising code for causing the first wireless communication device to transmit a configuration indicating the interlaced frequency structure for communicating in the first frequency band of the frequency spectrum.

35. The computer-readable medium of claim 34, wherein the code for causing the first wireless communication device to select the interlaced frequency structure is further configured to select the interlaced frequency structure based on a power headroom of the second wireless communication device.

36. The computer-readable medium of claim 31, further comprising code for causing the first wireless communication device to receive, from the second wireless communication device, a configuration indicating the interlaced frequency structure for communicating in the first frequency band of the frequency spectrum, wherein the code for causing the first wireless communication device to select the interlaced frequency structure is further configured to select the interlaced frequency structure based on the configuration.

37. The computer-readable medium of claim 31, further comprising:
   code for causing the first wireless communication device to communicate, with the second wireless communication device, a configuration indicating a first set of random access resources having the interlaced frequency structure and a second set of random access resources having the non-interlaced frequency structure; and
   code for causing the first wireless communication device to communicate, with the second wireless communication device, a random access signal based on the configuration.

38. The computer-readable medium of claim 37, wherein the first set of random access resources and the second set of random access resources are in different frequency bands within the frequency spectrum.

39. The computer-readable medium of claim 37, wherein the first set of random access resources and the second set of random access resources are in different time periods.

40. The computer-readable medium of claim 37, wherein the code for causing the first wireless communication device to communicate the configuration is further configured to transmit, to the second wireless communication device, the configuration, and wherein the code for causing the first wireless communication device to communicate the random access signal is further configured to monitor for the random access signal.

41. The computer-readable medium of claim 37, wherein the code for causing the first wireless communication device to communicate the configuration is further configured to receive, from the second wireless communication device, the configuration.

42. The computer-readable medium of claim 41, further comprising:
   code for causing the first wireless communication device to determine whether to transmit the random access signal to the second wireless communication device using the first set of random access resources or the second set of random access resources based on at least one of the configuration, a power headroom of the second wireless communication device, or a power utilization factor of the second wireless communication device.

43. The computer-readable medium of claim 41, wherein the code for causing the first wireless communication device to communicate the random access signal is further configured to:
   transmit, to the second wireless communication device using the second set of random access resources, a first random access signal with the non-interlaced frequency structure at a first transmit power; and
   transmit, to the second wireless communication device using the first set of random access resources, a second random access signal with the interlaced frequency structure at a second transmit power greater than the first transmit power.

44. The computer-readable medium of claim 43, further comprising code for causing the first wireless communication device to determine to transmit the second random access signal with the interlaced frequency structure using the first set of random access resources based on a comparison between the second transmit power and a PSD parameter of a frequency band of the second set of random access resources.

45. The computer-readable medium of claim 31, wherein the frequency spectrum includes a first SCS for the non-interlaced frequency structure, wherein the code for causing the first wireless communication device to communicate the communication signal is further configured to communicate the communication signal using a second SCS for the interlaced frequency structure, and wherein the first SCS is greater than the second SCS.

* * * * *